United States Patent [19]
Imai et al.

[11] Patent Number: 6,008,969
[45] Date of Patent: *Dec. 28, 1999

[54] PLANAR RECORDING HEAD HAVING FORMED YOKES

[75] Inventors: Darren T. Imai, Los Gatos; David D. Roberts, Santa Cruz; Dimitre A. Latev; William C. Cain, both of San Jose, all of Calif.

[73] Assignee: Read-Rite Corporation, Milpitas, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/993,719

[22] Filed: Dec. 18, 1997

[51] Int. Cl.⁶ .................. G11B 5/31; G11B 5/60
[52] U.S. Cl. ........................................... 360/126
[58] Field of Search .................... 360/113, 110, 360/125, 126

[56] References Cited

U.S. PATENT DOCUMENTS 5,228,184  7/1993  Kishi ........................ 29/603.2

FOREIGN PATENT DOCUMENTS

| | | |
|---|---|---|
| 0 475 397 A2 | 3/1992 | European Pat. Off. . |
| 1-096814 | 4/1989 | Japan . |
| 3-127308 | 5/1991 | Japan . |
| 4-119509 | 4/1992 | Japan . |
| 4-360005 | 12/1992 | Japan . |
| 5-020640 | 1/1993 | Japan . |
| 5-101331 | 4/1993 | Japan . |
| 5-197920 | 8/1993 | Japan . |
| 5-290325 | 11/1993 | Japan . |
| 6-004829 | 1/1994 | Japan . |
| 6-338028 | 12/1994 | Japan . |

*Primary Examiner*—William J. Klimowicz
*Attorney, Agent, or Firm*—Nathan N. Kallman

[57] ABSTRACT

A planar thin film magnetic head comprises an insulating substrate, a pair of insulating pedestals formed on the substrate, a top magnetic yoke having a central portion disposed over the substrate and having opposite ends supported on each of the pedestals. A conductor is provided over the top yoke central portion, and an insulating layer is disposed between the conductor and the top magnetic yoke. A bottom magnetic yoke is disposed over the conductor and has a gap in a central portion and opposite ends in contact with the top yoke ends.

13 Claims, 6 Drawing Sheets

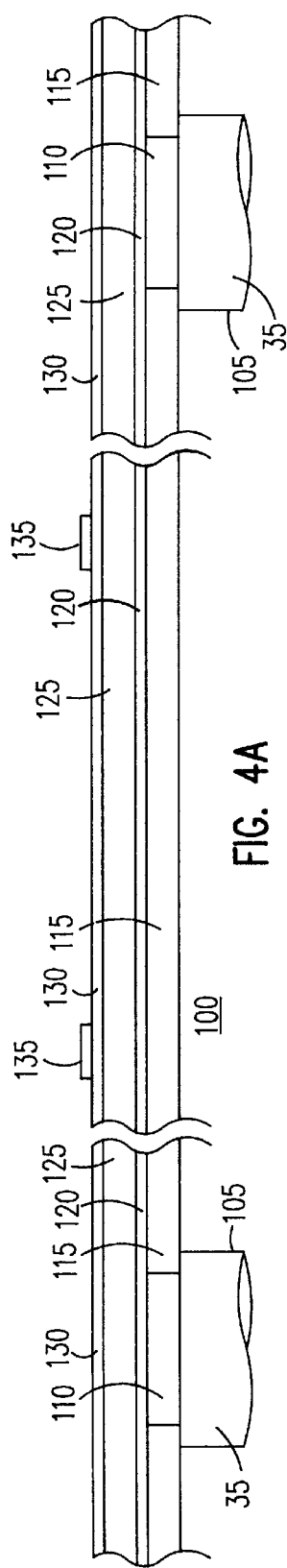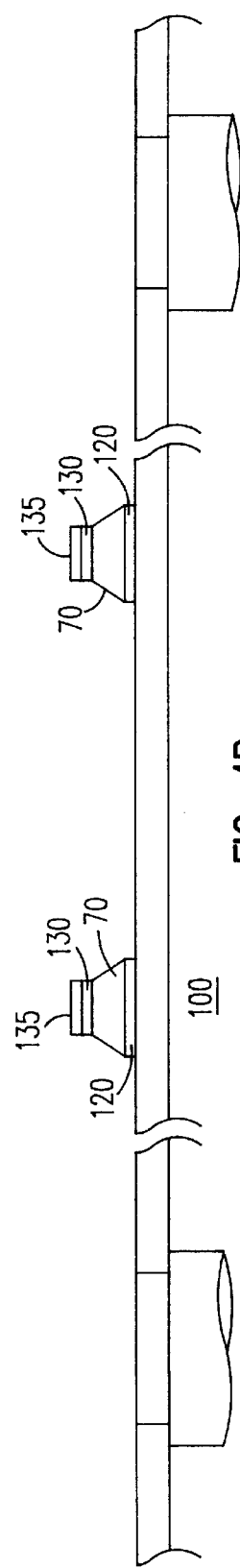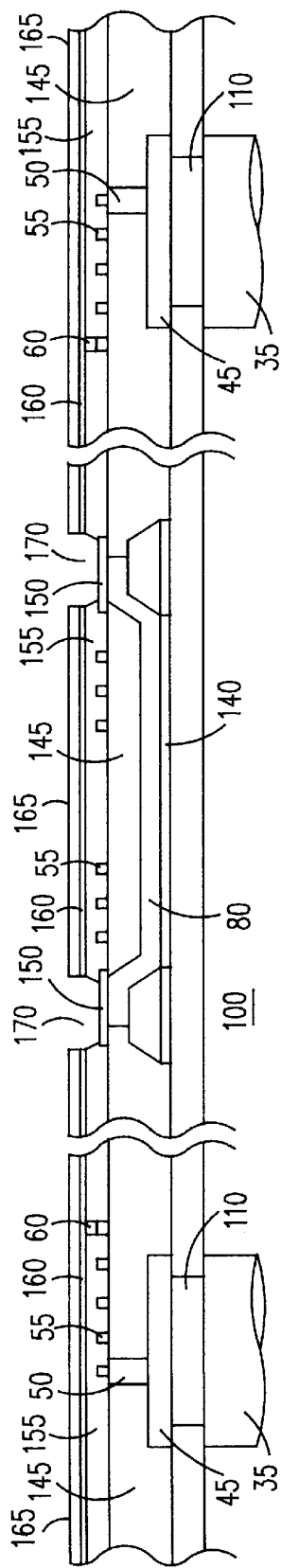

PLANAR RECORDING HEAD HAVING FORMED YOKES

FIELD OF THE INVENTION

The present invention relates to a planar thin film magnetic recording head having formed yokes and a process for making the head.

BACKGROUND OF THE INVENTION

It is recognized that planar recording heads, having coils formed generally parallel to a recording media, exhibit performance improvements in comparison to heads in which the coils are mounted perpendicular to the recording medium. For example, the higher field gradients produced during a reading operation by a perpendicular head results in a distortion of the detected bit recorded on the recording medium. This distortion appears as negative signals on the leading and trailing edges of the main positive signal, or undershoot components. These undershoot signals distort the detected main signal and degrade a measured signal-to-noise ratio. Undershoot components are avoided with planar heads.

Furthermore, conventional thin film heads with vertical coils require very small throat height tolerances to maintain satisfactory output, while planar heads are less sensitive to throat height tolerance. Also, planar heads have lower normalized inductance than heads with vertical coils, which improves the signal-to-noise ratio.

A prior art planar head 1 is shown in FIG. 1. A planar top yoke 2 and insulator layer 3 are formed on a substrate 4. Magnetic return studs 5, preferably made of Permalloy (approximately 80Ni:20Fe), are formed in contact with the yoke 2 and sequential process steps form coils 6 and additional insulator layers 7. Bottom yoke pieces 8 are formed in contact with the tops of the return studs 5. Finally poles 9 are formed between the bottom yoke pieces 8, forming a gap 10. When an electric current is directed to the coils 6 by leads (not shown), a magnetic flux is generated in the top yoke 2, return studs 5, bottom yoke pieces 8 and poles 9. The flux impinges on a magnetic medium 11 to record data pulses and the data signals are read by sensing the flux emanating from the medium. For this reason, the yoke portions of magnetic head are sometimes referred to as magnetic flux guides.

Such prior art planar recording heads exhibit, however, certain performance disadvantages. For example, the return studs 5 formed of many layers display low magnetic permeability which reduces the magnetic efficiency of the head, resulting in reduced signal amplitudes. Further, the studs 5 have a magnetic anisotropy that is parallel to the substrate, which direction is perpendicular to the direction of the flux induced in the studs during writing and reading. This perpendicular orientation of the stud anisotropy with the induced flux undesirably results in noise and low efficiency of the head. The process to make conventional planar heads also includes many plating steps, e.g., with Permalloy, which makes the process difficult to control.

SUMMARY OF THE INVENTION

According to this invention, a planar thin film magnetic head comprises an insulating substrate, a pair of insulating pedestals formed on the substrate, and a top magnetic yoke having a central portion disposed over the substrate. The top magnetic yoke has opposite ends supported on each of the pedestals. A conductor is provided over the top yoke central portion, and an insulating layer is disposed between the conductor and the top magnetic yoke. A bottom magnetic yoke is disposed over the conductor and has opposite ends in contact with the top yoke ends. The bottom magnetic yoke has a gap in a central portion.

BRIEF DESCRIPTION OF THE DRAWINGS

FIGS. 4A through 4E illustrate a fabrication process for the head of FIG. 2.

DETAILED DESCRIPTION OF THE INVENTION

Figure 1:
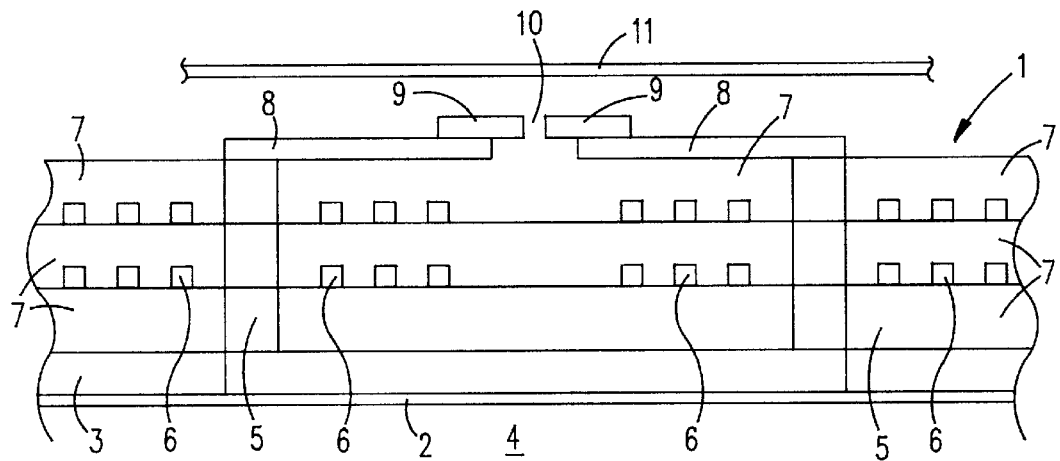
FIG. 1 is a cross-section side view of a prior art planar head.
Figure 2:
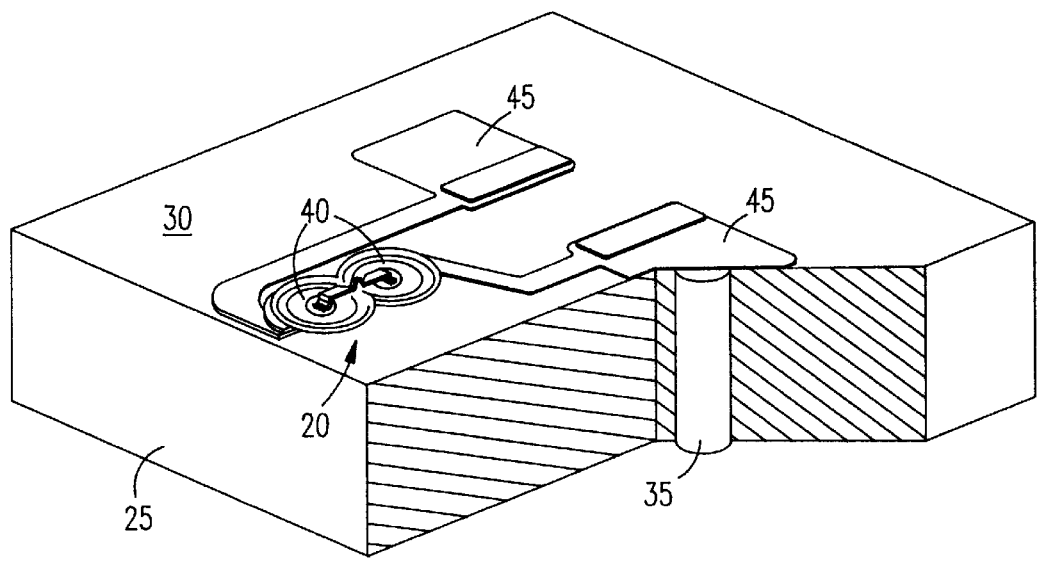
FIG. 2 is a cross-section perspective view of a planar head of the invention.

A planar magnetic head according to the invention may be embodied in a flying head for use with rigid magnetic media in a disk drive or in a tape head for use with magnetic tape media. For example, FIG. 2 shows a planar head 20 of the invention mounted on a slider 25, having a disk facing surface 30. Conductive studs 35 (only one shown) carry electric signals to and from pancake coils 40 through leads 45.

Figure 3:
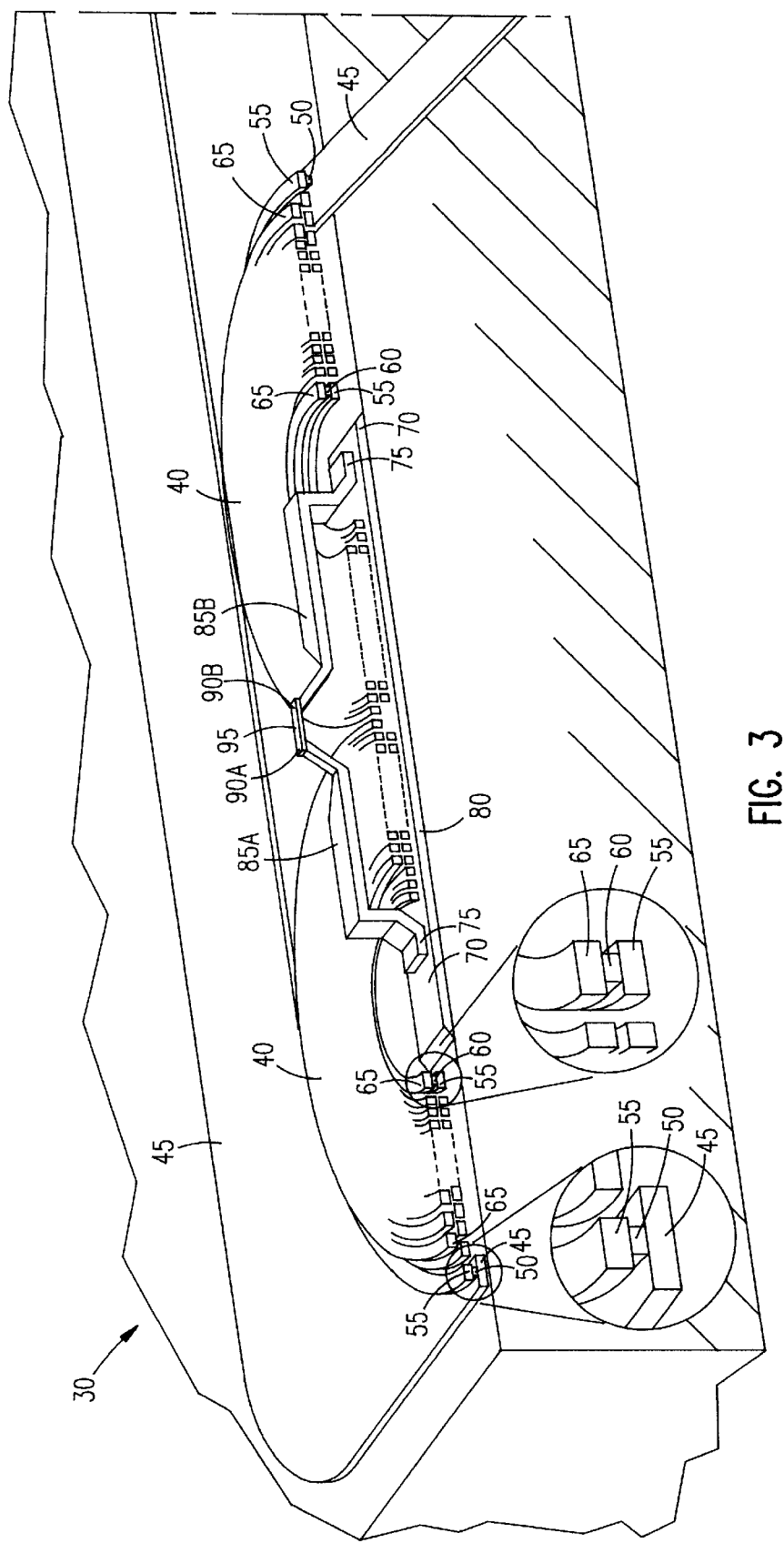
FIG. 3A is an enlarged cross-section perspective view of a planar head of the invention and FIGS. 3B and 3C are enlarged sections of FIG. 3A.
Figure 3A:
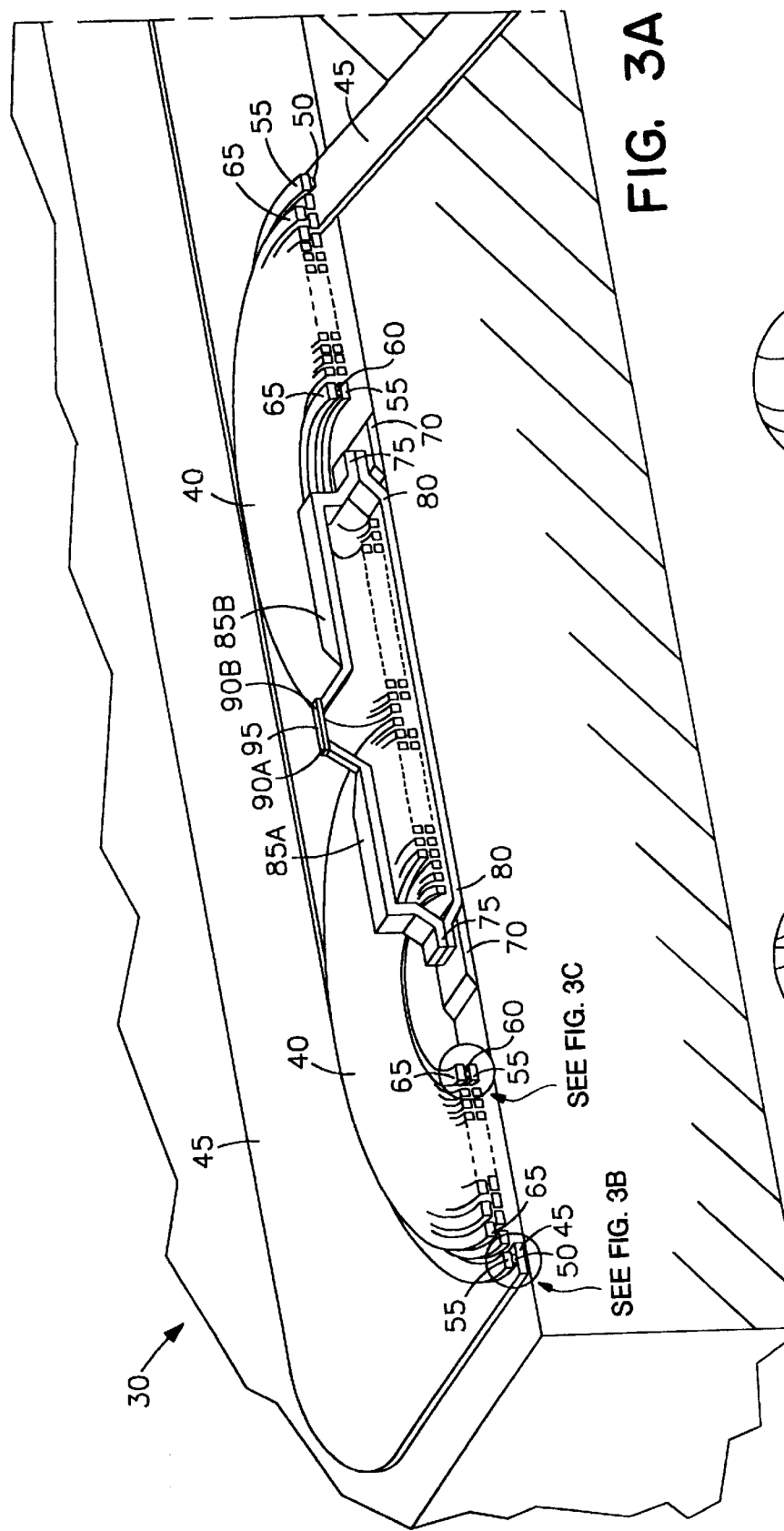
Figure 3C:
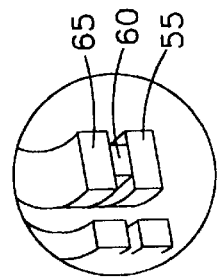
Figure 3B:
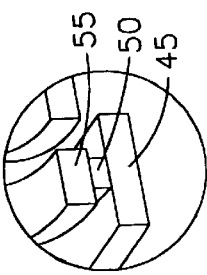

Additional details of the magnetic head of the invention are shown in FIG. 3. Leads 45 are in electrical contact with lead interconnects 50, which connect to a first set of coils 55. The first coils spiral inward to coil interconnects 60 which connect to a second set of coils 65, which form a continuous element that spirals outward from a center of one of the coils 65 and inward to the center of the other one of coils 65 (coils 55 and 65 are designated as coils 40 in FIG. 2). In the center of coils 55 and 65, pedestals 70 support ends 75 of a top yoke 80. Top yoke ends 75 are in contact with bottom yoke portions 85A and 85B, which forms angular and vertical steps over coils 55 and 65. Distal ends of portions 85A and 85B connect to poles 90A and 90B, separated by a gap 95.

FIG. 4A is a side view of an initial processing step in the formation of a head, or transducer, of the invention. A wafer substrate 100 is formed of an insulating material, such as $Al_2O_3$, SiC, $Si_3N_4$ or Si, which substrate is formed into a magnetic head slider 25 (FIG. 2). Vias 105 are formed in the substrate 100 and are filled with a conductive material to form electrical return studs 35 to form electrical connections between the transducer and electrical components of a disk drive. The conductive material forming the studs 35 is selected to have a thermal expansion coefficient that closely matches that of the substrate material. For example, if $Al_2O_3$ is used in the substrate 100, a mixture of sintered Cu and W, in atomic percents of approximately 15 and 85, respectively, may be selected for the studs 35. For example, the process disclosed in U.S. Pat No. 4,942,076 may be used to form studs 35.

Studs extensions 110 are formed on the studs 35. For example, Cu may be plated to form the extensions 110. An undercoat 115 is formed over the substrate 100 and contacting the extensions 110. The undercoat 115 is selected to have a thermal expansion coefficient that closely matches that of the material that is used to form the substrate 100. For example, the undercoat 115 may be formed of $Al_2O_3$ to a thickness of approximately 12μ by sputtering. The undercoat 115 is then planarized by lapping to a thickness of approximately 4μ and polished to expose the extensions 110.

A first etch-stop layer 120, made of SiC or Si, for example, is deposited over the planarized undercoat 115, and an overcoat 125 is then deposited over the layer 120, which overcoat may be formed of, for example $Al_2O_3$. A metal or dielectric mask 130 is then deposited over the overcoat 125, which mask may be formed of NiFe or SiC by sputtering. A layer of photoresist is applied over the mask 130 and, using conventional photolithography methods, photoresist caps 135 are formed.

As shown in FIG. 4B, a dry etching method such as reactive ion etching ("RIE") or ion beam etching ("IBE") is used to remove the mask 130 except those portions under the caps 135. This method of forming a protective layer of metal to enable shaping of an underlayer, of for example $Al_2O_3$, will subsequently be referred to as "metal mask lithography". A wet etch such as HF is then used to remove overcoat 125 except those portions under the caps 135, forming top yoke pedestals 70. The caps 135 are then stripped, a wet etch is used to remove portions of the mask 130 under the caps 135, and a dry etch is used to remove the entire etch-stop layer 120 in the field except under the pedestals 70.

As shown in FIG. 4C, a next step forms a magnetically active portion of the transducer by sputtering a seed layer 140, of for example NiFeMo or NiFe, over the undercoat 115 and pedestals 70 as shown in FIG. 4C. The top yoke 80 is then formed of NiFe by window-frame plating, which yoke has a central portion and end portions formed over each of the pedestals 70. As part of the window-frame plating process, the seed layer 140 is removed by IBE from the frame area and plated NiFe is removed from the field, i.e., all except under the yoke 80, by wet etching.

Leads 45 are then formed over the extensions 110 and lead interconnects 50 are formed over the leads by, for example, patterning with photolithography and through-hole plating of Cu. A first insulating layer 145 is then formed over the yoke 80 and pedestals 70, which layer 145 is then planarized to expose top portions of the yoke over the pedestals 70 and lead interconnects 50.

Etch stop covers 150 are formed over the pedestals 70 to protect the exposed portions of the yoke 75 from subsequent process steps. One means of forming the covers 150 is by depositing an etch stop layer, such as SiC or Si, patterning it by using photolithography techniques, and removing the exposed etch stop portions with RIE or IBE.

A first set of coils 55 and coil interconnects 60 are then formed by conventional means, such as through-hole plating. A second insulating layer 155, of for example $Al_2O_3$, is then formed over the coils 55 and coil interconnects 60, which layer is then planarized to expose the coil interconnects.

Metal mask lithography is then used to produce another protective structure. Specifically, a metal or dielectric mask layer 160 is formed over the second insulating layer 155, and a photoresist layer 165 is selectively formed in the field except over the covers 150. Unprotected portions of the mask layer 160 are removed by dry etching and unprotected portions of the layer 155 are removed by for example wet etching with HF to form first vias 170.

Figure 4D:
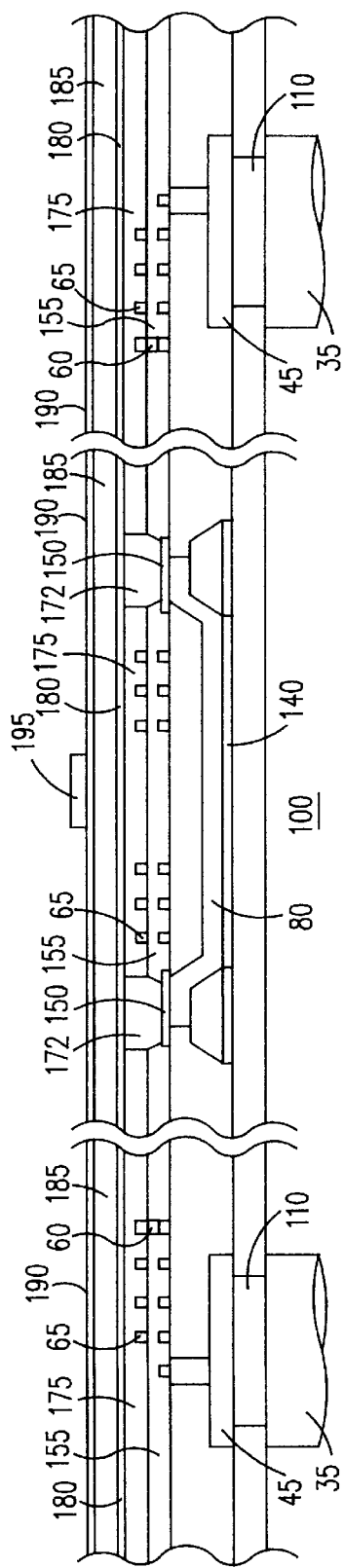

The layer 165 is then stripped away and the underlaying portions of mask layer 160 are removed by etching, as shown in FIG. 4D. A seed layer (not shown) is then formed over the surface and photolithography is used to pattern a second set of coils 65 on layer 155, which may be formed by through hole plating. The coils 65 make contact with the coil interconnects 60. Sacrificial plugs 172 are then patterned and plated into vias 170 to a height of several microns above the coils 65. The surface is overcoated with a third insulating layer 175 of for example sputtered $Al_2O_3$ and planarized to expose the plugs 172.

Metal mask lithography is again employed to form the magnetic pole portion of the transducer. Specifically, an etch stop layer 180 is deposited over the planarized surface followed by a fourth insulating layer 185, a metal or dielectric mask 190 and a photoresist cap 195. A dry etch is used to remove portions of the mask 190 except under the cap 195. A wet etch is used to selectively remove layer 195, thus forming a main pedestal 200 as shown in FIGS. 5A–5E. The etch stop layer 180 is removed in the field (except under the pedestal 200) by dry etching such as RIE.

The sacrificial plugs 172 (FIG. 4D) are then removed, for example by a Cu selective wet etch such as a solution of $(NH_4)_2S_2O_8$ and $NH_4OH$, to form second vias 205 which include the first vias 170 and extend to the covers 150 (FIG. 4D). The covers 150 are removed by either IBE or RIE. A bottom yoke 85 is then window-frame plated into via 205 and over the pedestal 200. The yoke 85 consists of ends in electrical contact with the ends of top yoke 80, a central portion that covers the layer 175, and is generally parallel to the coils 65. The bottom yoke ends include arcuate portions covering the insulating layer 155 and vertical portions connecting the arcuate portions to the central portion. The entire transducer is then covered with an overcoat layer 210 of $Al_2O_3$.

Figure 4E:
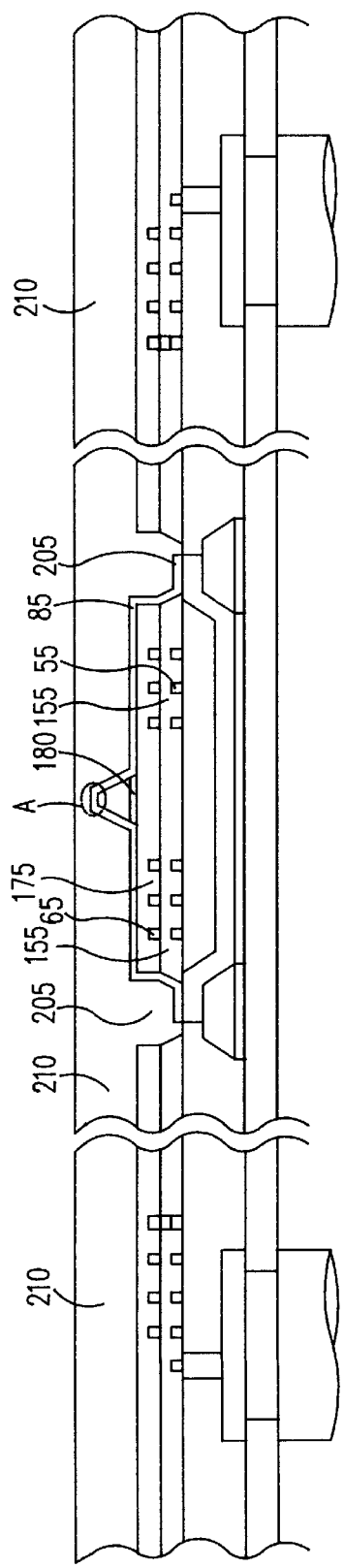
Figure 5A:
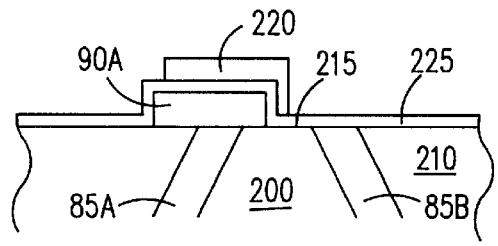
FIGS. 5A through 5E illustrate a fabrication process for a Detail A of FIG. 4E.

FIGS. 5A–5E illustrate the steps in forming features in a detail designated by dotted line A in FIG. 4E. As shown in FIG. 5A, the overcoat layer 210 is planarized to expose a mesa 215 on the main pedestal 200 and separating the yoke 85 into portions 85A and 85B. The mesa 215 is approximately 16μ wide. A first pole 90A ("P1") is formed over one bottom yoke portion 85A and approximately one-half of the mesa 215, by window-frame plating of NiFe, for example. A gap layer 225 of for example SiC, Si or $SiO_2$ is then sputtered over the pole 90A and overcoat layer 210, and a photoresist mask 220 is formed over the gap layer 225.

Figure 5B:
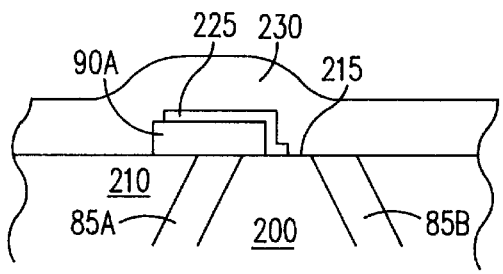
Figure 5C:
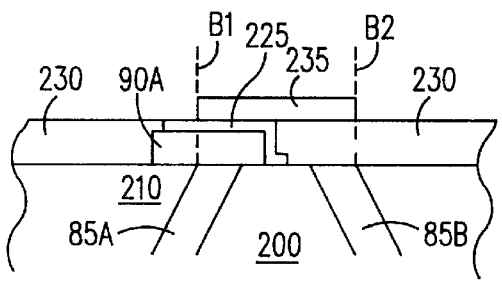
Figure 5D:
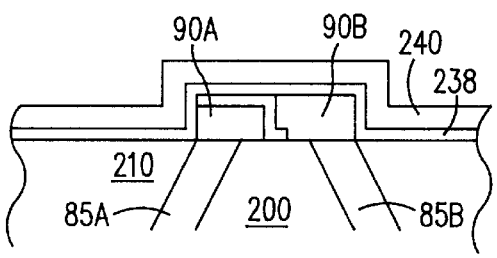

Portions of the gap layer 225 not protected by the mask 220 are removed by RIE or IBE, leaving only a portion covering the mesa 215 and a part of the pole 90A as shown in FIG. 5B. A second pole layer 230 is then formed, by for example sheet plating of NiFe. The layer 230 is then lapped to expose the gap layer 225 and a photoresist cap 235 is formed in approximate registration with the bottom yoke portions 85A and 85B, as shown by dotted lines B1 and B2 in FIG. 5C. The portions of the layer 230, first pole 90A and gap layer 225 that were formed to the left of line Bi and the portions of the layer 230 to the right of line B2 are removed by for example IBE to further shape the first pole 90A and form a second pole 90B ("P2"), as shown in FIG. 5D, after which the cap 235 (FIG. 5C) is stripped away.

Figure 5E:
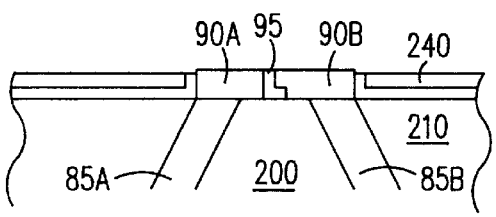

An adhesion layer 238 is formed over the poles 90A, 90B and the overcoat layer 210, by for example sputtering of Si to a thickness of approximately 1,000 Å. A protective coating 240 is then formed over the adhesion layer 238, for example, by plasma enhanced chemical vapor deposition ("PECVD"), diode sputtering of carbon, or ion beam deposition of diamond-like carbon. The coating 240 may also define an air bearing shape over disk facing surface 30 (FIG. 2), by using conventional photolithography and RIE to remove portions of coating 240 not forming the air bearing. Finally, the coating 240 is lapped to provide a flat air bearing surface and to expose the gap 95, as shown in FIG. 5E.

Although the present invention has been described with reference to preferred embodiments, those skilled in the art will recognize that changes may be made in form and detail without departing from the spirit and scope of the invention.

What is claimed is:

1. A method for making a planar thin film magnetic head on a substrate comprising the steps of:

forming a pair of insulating pedestals on the substrate;

forming vias in the substrate filled with conductive material;

forming a top magnetic yoke that is flat across its entirety except at its opposite ends, and having a central portion disposed over the substrate and having said opposite ends supported on each of the pedestals;

forming an insulating layer over the top yoke central portion;

forming a pancake coil assembly comprising a first planar conductive coil formed over said top yoke central portion, and a second planar conductive coil formed substantially parallel to and over said first planar conductive coil;

forming conductive interconnects for connecting said first and second planar conductive coils to a current supply;

forming conductive leads connected in electrical contact with said conductive interconnects; and forming a bottom magnetic yoke having spaced central portions and magnetic poles with a gap therebetween located at a central portion of said bottom magnetic yoke, said poles and gap being spaced further from said flat top magnetic yoke than said bottom magnetic yoke central portions, and having opposite ends of said bottom magnetic yoke in contact with the top yoke ends, wherein portions of said first and second planar conductive coils are disposed within the central portions of said bottom magnetic yoke between the ends of said bottom magnetic yoke, and other portions of said first and second planar conductive coils are disposed between said pedestals and said conductive interconnects.

2. The method of claim 1 wherein the step of forming the bottom yoke ends includes the step of forming arcuate portions extending toward the bottom yoke central portion.

3. The method of claim 2, wherein the step of forming the bottom yoke ends includes the step of forming vertical portions connecting the arcuate portions to the botttom yoke central portion.

4. The method of claim 1 further comprising the step of forming magnetic pole pieces disposed on each side of the gap.

5. A planar thin film magnetic head air bearing slider comprising:

an insulating substrate;

vias formed in the substrate filled with conductive material;

a pair of insulating pedestals formed over said substrate;

a top magnetic yoke that is flat across its entirety except at its opposite ends, and having said opposite ends supported respectively by said pair of insulating pedestals and having a central portion disposed over said substrate between said opposite ends;

a first planar conductive coil formed over said top yoke central portion;

a second planar conductive coil formed substantially parallel to and over said first planar conductive coil;

conductive interconnects for connecting said first and second planar conductive coils to a current supply;

conductive leads connected in electrical contact with said conductive interconnects;

a bottom magnetic yoke formed with central portions disposed over said second planar conductive coil, said bottom magnetic yoke central portions having opposite ends in contact with said opposite ends of said top magnetic yoke, portions of said first and second planar conductive coils being disposed between the ends of said bottom magnetic yoke within the central portions of said bottom magnetic yoke, and other portions of said first and second planar conductive coils being disposed between said pedestals and said conductive interconnects;

magnetic poles disposed between said bottom magnetic yoke central portions, said poles having a gap therebetween; and insulating material disposed between said conductive coils and said top and bottom magnetic yokes;

wherein said central portion of said top magnetic yoke is completely spaced from said central portions of said bottom magnetic yoke, and wherein said gap is spaced further from said central portion of said top magnetic yoke than the spacing between said central portion of said top magnetic yoke and said central portions of said bottom magnetic yoke.

6. The planar thin film head as defined in claim 5, wherein the ends of the bottom yoke include arcuate portions extending toward the bottom yoke central portion.

7. The planar thin film head as defined in claim 6, wherein the ends of the bottom yoke further include vertical portions connecting the arcuate portions to the bottom yoke central portion.

8. The planar thin film head as defined in claim 5, further comprising magnetic pole pieces formed on each side of the gap.

9. A planar thin film magnetic head formed on a substrate comprising:

a pair of insulating pedestals formed over said substrate;

a magnetic yoke assembly having a top yoke formed completely flat except at its opposite ends and having said opposite ends supported respectively by said pair of insulating pedestals and a central portion between said ends on the substrate, and having a bottom yoke with central portions completely spaced from said top yoke central portion;

a gap formed between said bottom yoke central portions;

said bottom yoke portions having ends in contact with respective ends of said top yoke;

a first conductive coil formed over said substrate between said top yoke and said bottom yoke portions;

a second conductive coil formed over said first conductive coil;

conductive interconnects for connecting said first and second conductive coils to a current supply;

conductive leads connected in electrical contact with said conductive interconnects;

portions of said first and second conductive coils being disposed between the ends of said bottom yoke portion within the central portions of said bottom yoke. and other portions of said first and second conductive coils being disposed between said pedestals and said conductive interconnects;

insulating material disposed between said top yoke and said bottom yoke portions and said conductive coils.

10. The planar thin film head as defined in claim 9 wherein the bottom yoke portions ends include arcuate portions extending toward the bottom yoke central portion.

11. The planar thin film head as defined in claim 10, wherein the bottom yoke ends futher include vertical portions connecting the arcuate portions to the bottom yoke central portions.

12. The planar thin film head as defined in claim 9, further comprising magnetic pole pieces formed on each side of the gap.

13. The planar thin film head as defined in claim 9, further comprising:
   vias provided in the substrate for forming electrical return studs for connection of the thin film magnetic head to electrical components of a disk drive; and
   planar leads connecting the studs to the first conductive coil.

* * * * *